United States Patent
Peter et al.

(10) Patent No.: US 9,356,789 B1
(45) Date of Patent: May 31, 2016

(54) ROBUST CONTROL PLANE ASSERT FOR PROTOCOL INDEPENDENT MULTICAST (PIM)

(71) Applicant: Juniper Networks, Inc., Sunnyvale, CA (US)

(72) Inventors: Anish Peter, Bangalore (IN); Robert W. Kebler, Newburyport, MA (US); Vikram Nagarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 96 days.

(21) Appl. No.: 14/036,772

(22) Filed: Sep. 25, 2013

(51) Int. Cl.
*H04L 12/28* (2006.01)
*H04L 12/18* (2006.01)

(52) U.S. Cl.
CPC ..................... *H04L 12/18* (2013.01)

(58) Field of Classification Search
CPC ....... H04L 12/185; H04L 12/18; H04L 45/16; H04L 45/122; H04L 45/22
USPC .......................... 370/390, 392, 389, 401, 254
See application file for complete search history.

(56) References Cited

U.S. PATENT DOCUMENTS

| | | | | |
|---|---|---|---|---|
| 6,990,098 B1 * | 1/2006 | Eberle et al. | ................... | 370/390 |
| 7,447,225 B2 * | 11/2008 | Windisch et al. | ............. | 370/428 |
| 7,860,093 B2 * | 12/2010 | Shepherd et al. | ............. | 370/390 |
| 8,121,025 B2 * | 2/2012 | Duan et al. | ................... | 370/218 |
| 8,345,683 B1 * | 1/2013 | Hemige | ........................ | 370/390 |
| 8,437,351 B2 * | 5/2013 | Tempia Bonda | .............. | 370/390 |
| 8,510,551 B1 * | 8/2013 | Desai et al. | .................... | 713/163 |
| 8,638,787 B2 * | 1/2014 | Wijnands | ....................... | 370/390 |
| 8,976,644 B2 * | 3/2015 | Arumugam et al. | .......... | 370/217 |
| 9,019,981 B1 * | 4/2015 | Weinstein et al. | ............. | 370/432 |
| 2007/0091891 A1 * | 4/2007 | Zwiebel et al. | ............... | 370/390 |
| 2007/0165632 A1 * | 7/2007 | Zwiebel | ........................ | 370/390 |
| 2011/0267962 A1 * | 11/2011 | J S A et al. | .................... | 370/242 |
| 2013/0294448 A1 * | 11/2013 | Mentze et al. | ................. | 370/390 |

OTHER PUBLICATIONS

Fenner et al. "Protocol Independent Multicast—Sparse Mode (PIM-SM): Protocol Specification (Revised)", Network Working Group, RFC 4601, Aug. 2006, 151 pgs.

Hemige, et al. "Improved Assert in PIM-SM", Internet Draft, Internet Engineering Task Force, draft-hemige-pim-improved-assert-00.txt, Nov. 2005, 9 pgs.

* cited by examiner

*Primary Examiner* — Rasheed Gidado
(74) *Attorney, Agent, or Firm* — Shumaker & Sieffert, P.A.

(57) ABSTRACT

Techniques are described for providing robust control plane asserts in a network using Protocol Independent Multicast (PIM) or other routing protocols for controlling delivery of multicast traffic. In one example, a router includes a control unit having a hardware-based processor executing a Protocol Independent Multicast (PIM) protocol. The control unit, when executing the PIM protocol, initiates an election process for selecting, from a plurality of routers, a forwarding router to forward multicast traffic to a shared media computer network. In addition, the control unit determines whether the multicast traffic has been received by the router and outputs, in association with the election process, a PIM assert message that includes an indication as to whether the router has successfully received the multicast traffic.

22 Claims, 7 Drawing Sheets

ROBUST CONTROL PLANE ASSERT FOR PROTOCOL INDEPENDENT MULTICAST (PIM)

TECHNICAL FIELD

The invention relates to computer networks and, more particularly, to controlling delivery of multicast traffic in computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to control delivery of multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR).

PIM-SM is a multicast routing protocol that can use the underlying unicast routing information base or a separate multicast-capable routing information base. Routers within computer networks utilizing PIM-SM typically build unidirectional trees rooted at a central node, referred to as a Rendezvous Point (RP), per multicast group, and optionally create shortest-path trees per multicast source group combination. Further details regarding PIM-SM can be found in W. Fenner, et al., "Protocol Independent Multicast-Sparse Mode (PIM-SM)," RFC 4601, August 2006, the entire content of which is incorporated by reference herein.

In many environments, PIM-SM and other multicast routing protocols are used to control delivery of multicast traffic within shared media networks (e.g., local area networks) (LANs), such as Ethernet networks. Unlike point-to-point transit links, shared media networks can introduce several complications to multicast communications, such as duplicate copies of multicast traffic appearing on the LAN by multiple upstream routers. PIM seeks to address these issues by performing an election of a single router for forwarding the multicast traffic. That is, a single router is elected to forward multicast traffic to a shared media LAN, thereby seeking to prevent duplicate data packets from appearing on the LAN from different routers. Conventionally, this election is performed using the PIM protocol upon detecting duplicate multicast traffic within the LAN. According to this "data driven" technique, upon detecting the presence of the duplicate multicast traffic, routers capable of sourcing the multicast traffic into the LAN exchange PIM Assert messages and ultimately elect an "assert winner" as the router for forwarding the multicast traffic. Control plane-driven assert mechanisms for PIM have been recently mentioned in industry. However, initial work in this area still suffers from many shortcomings in many real-world deployment scenarios.

SUMMARY

In general, this disclosure describes techniques for providing robust control plane asserts in a network using Protocol Independent Multicast (PIM) or other routing protocols for controlling delivery of multicast traffic.

In one example, a router comprises a control unit having a hardware-based processor executing a Protocol Independent Multicast (PIM) protocol. The control unit, when executing the PIM protocol, initiates an election process for selecting one of a plurality of routers as a forwarding router to forward multicast traffic to a shared media computer network. In addition, the control unit determines whether the multicast traffic has been received by the router and outputs, in association with the election process, a PIM assert message that includes an indication as to whether the router has successfully received the multicast traffic.

In another example, a method comprises initiating a Protocol Independent Multicast (PIM) election process for selecting one of a plurality of routers as a forwarding router to forward multicast traffic to a shared media computer network. The method further comprises determining, with a first one of the routers, whether the multicast traffic has been received and outputting a PIM assert message that includes an indication as to whether the first one of the routers has successfully received the multicast traffic.

In another example, a non-transitory computer-readable medium stores instructions that cause a processor to initiate, with a first one of a plurality of routers, a Protocol Independent Multicast (PIM) election process for selecting one of a plurality of routers as a forwarding router to forward multicast traffic to a shared media computer network. The instructions cause the processor to determine, with the first one of the routers, whether the network device has received multicast traffic from a source of the multicast traffic, and output, with the first one of the routers and in association with the PIM election process, a PIM assert message that includes an indication as to whether the first router has successfully received the multicast traffic.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
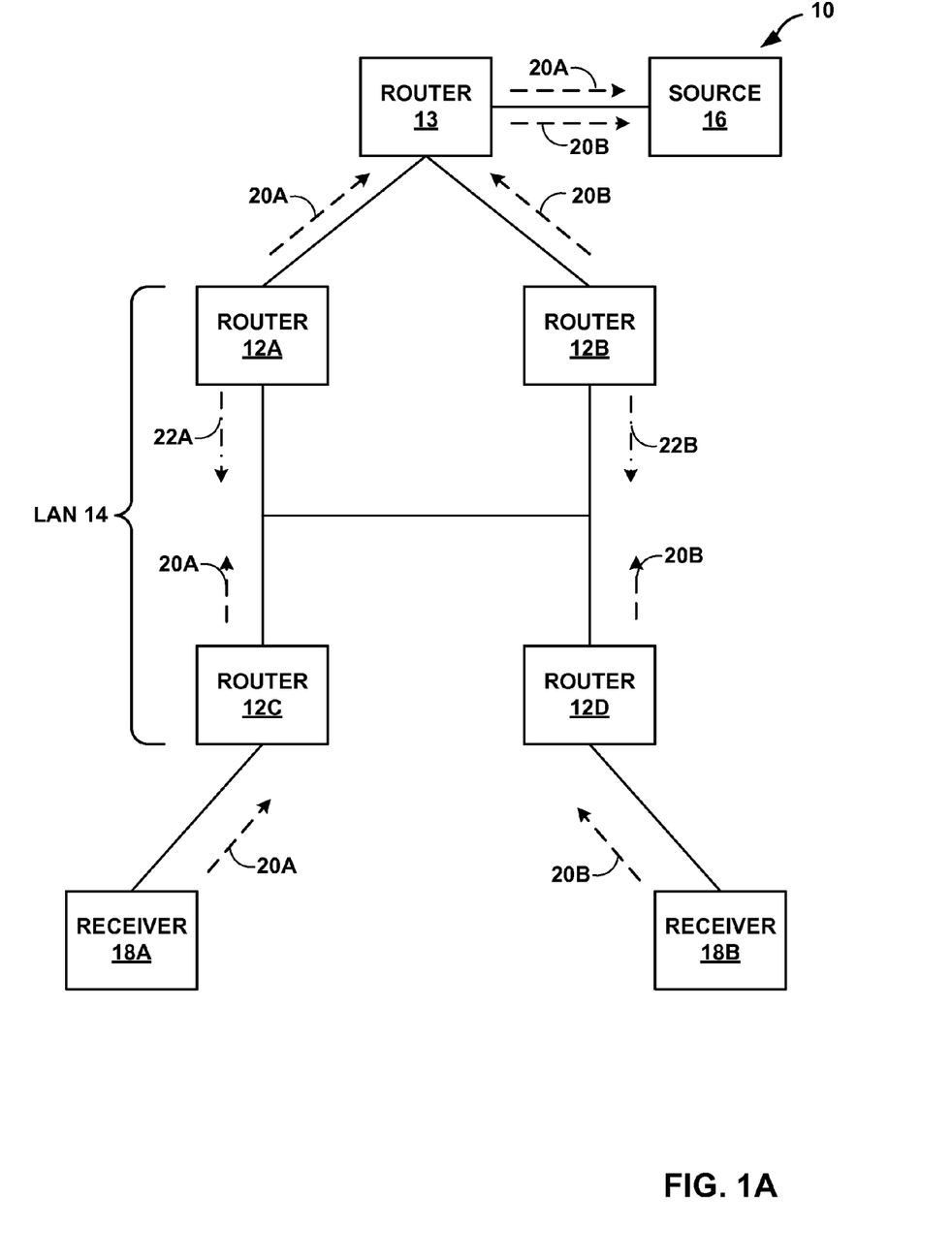
FIGS. 1A-1C are block diagram illustrating an example computer network in which routers implement the robust PIM assert mechanisms described herein.
Figure 1B:
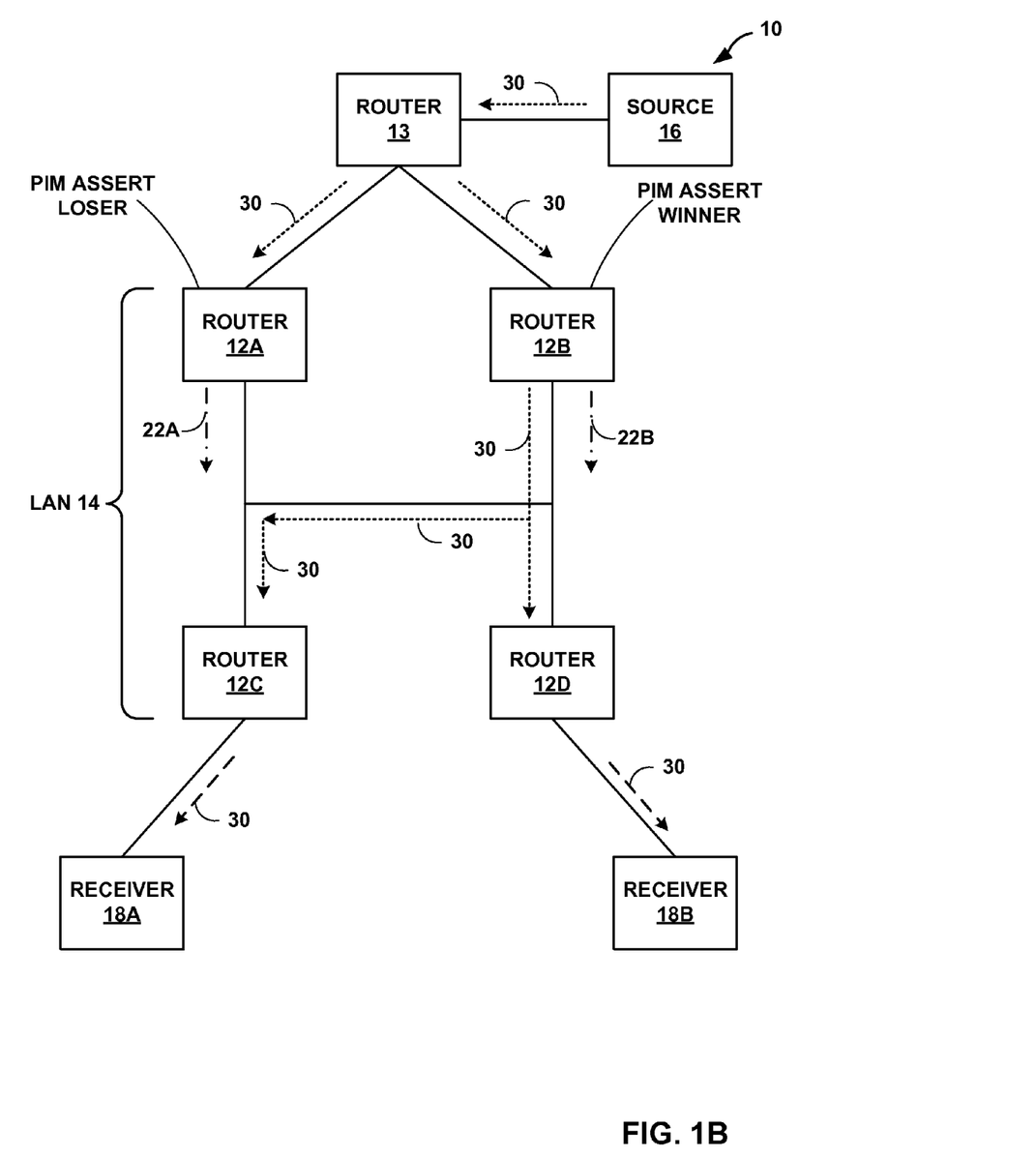
Figure 1C:
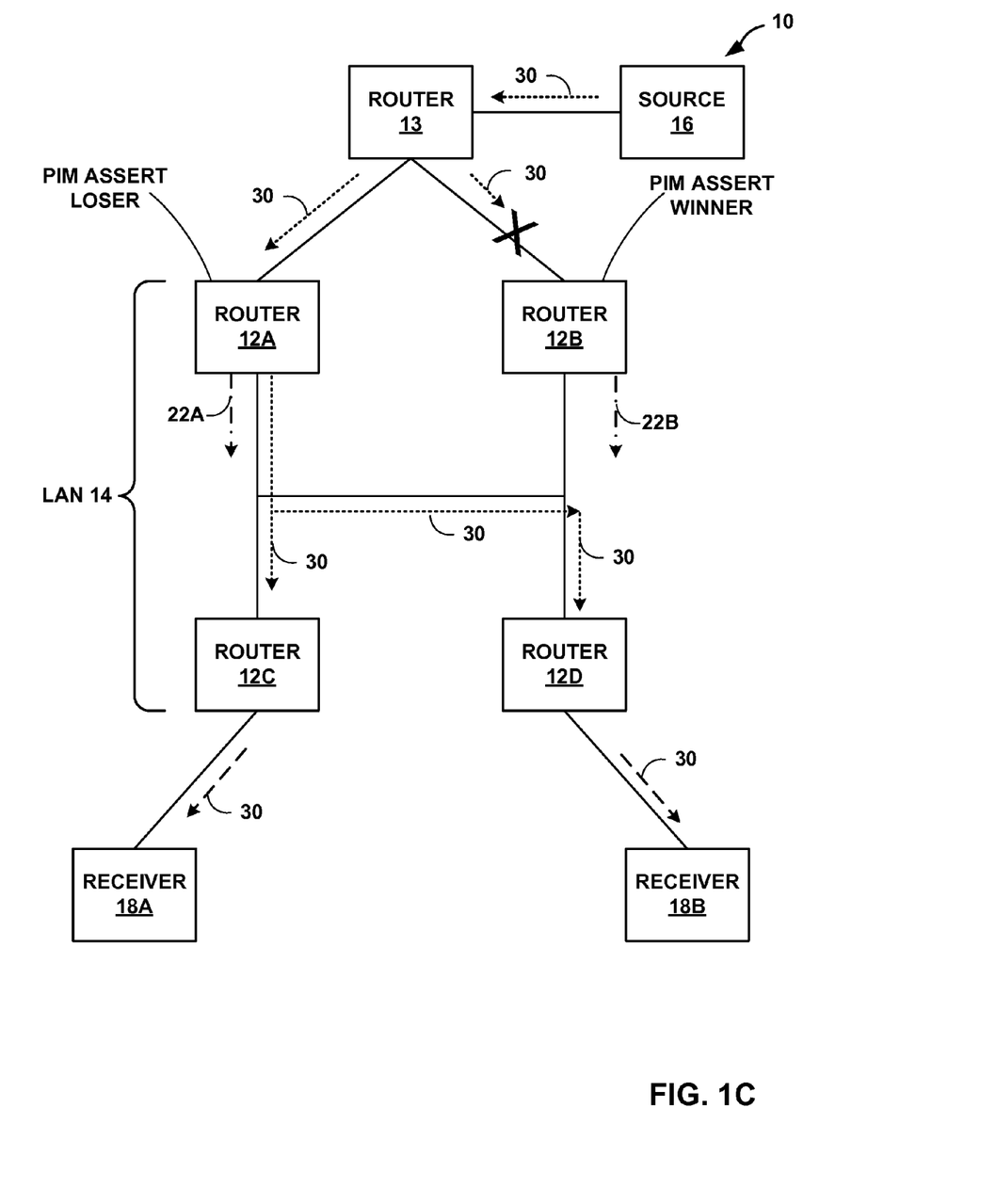

FIGS. 1A-1C are block diagrams illustrating an example computer network 10 in which routers 12A-12E ("routers 12") forward multicast traffic from source 14 to receivers 18A-18B ("receivers 18"). In the illustrated example, routers 12 are interconnected by shared media computer network typically referred to as a local area network (LAN) 14, such as an Ethernet network. Although not shown, LAN 14 may comprise one or more layer two (L2) switches and other networking components interconnected by physical links or other network interconnects. In this example, both routers 12A, 12B have physical connectivity to multicast source 16 via router 13, and routers 12C, 12D have physical connectivity to receivers 18A, 18B, respectively.

In general, routers 12 utilize the Protocol Independent Multicast (PIM) Sparse Mode (PIM-SM) routing protocol to control forwarding of multicast traffic within LAN 14. The techniques of this disclosure, described in more detail below, provide a robust control plane-drive assert mechanisms for PIM and other multicast routing protocols. As described herein, rather than rely on detection of the presence of duplicate multicast traffic within LAN 14, routers 12 utilize control plane-driven techniques in which the potential for multiple routers 12A, 12B to forward multicast traffic for the same source 16 is detected in the control plane based on control plane messages and, in response, a PIM assert procedure is triggered for election of one of the routers to forward the multicast traffic into the LAN. The elected router is referred to herein as the "assert winner" or the "forwarding router."

Moreover, as described herein, routers 12 utilize enhanced techniques with respect to the PIM assert procedure and may achieve certain advantages over existing techniques. For example, as described in further detail below, routers 12 may operate in accordance with the techniques described herein so as to avoid any potential "black holing" of multicast traffic in the event the router ultimately elected as the forwarding router the forwarding router (i.e., either router 12A or 12B in this example) does not actually receive the multicast traffic, e.g., due to an upstream problem with the multicast distribution tree between the forwarding router the forwarding router and source 16. Moreover, techniques are described for PIM assert mechanisms that may conserve bandwidth consumption and network resources, and therefore may scale more easily for use within large computer networks. Further, the described techniques provide interoperability and backward compatibility with routers that may not yet support the techniques described herein.

In the example of FIG. 1, computer network 10 may be an enterprise network, a campus network, a service provider network, a home network, or another autonomous system. In any of these examples, remotely located source 16 and receivers 18 may share data via computer network 10. As one example of network 10 as an enterprise network, each of source 16 and receivers 18 may comprise one or more servers or employee computer terminals located in different regions of a single office location. As another example of network 10 as an enterprise network, each of source 16 and receivers 18 may comprise a remote office location of a corporation such that enterprise network 10 may be extended across a public network, such as the Internet. Although illustrated in FIG. 1 as an enterprise network or a service provider network, the techniques of this disclosure are applicable to other network types, both public and private. Examples of other network types include local area networks (LANs), virtual local area networks (VLANs), virtual private networks (VPNs), and the like. In some examples, computer network 10 may be coupled to one or more additional private or public networks, e.g., the Internet. In other examples, computer network 10 may comprise or otherwise be coupled to the Internet or another public network. In some cases, computer network 10 may comprise a multi-protocol label switching (MPLS) network.

In the illustrated example, computer network 10 includes routers 12, which may comprise edge routers, core routers or other devices that provide layer three (L3) routing functions. Each of routers 12 couples to one or more of source 16 and receivers 18. Each of source 16 and receivers 18 may be included in a remote customer site that comprises a plurality of subscriber devices, such as media servers, desktop computers, laptops, workstations, PDAs, wireless devices, network-ready appliances, file servers, print servers or other devices. In some cases, the remote sites may be configured to support multicast traffic, such as Internet Protocol Television (IPTV), desktop conferences, corporate broadcasts, music and video web casts, and other forms of multimedia content.

In the example of FIG. 1A, receivers 18A, 18B send PIM Join messages 20A, 20B for, in this example, a multicast source and group (S,G) or multicast group independent of source (*,G). Moreover, in this example, receiver 18A has elected to use a unicast route to source 16 through routers 12A, 13 and receiver 18B has elected to use a unicast route to source 16 through routers 12B, 13. As such, PIM Join message 20A typically includes a unicast destination address of source 16 and lists an address of router 12A within an upstream address field of the PIM Join message. Similarly, PIM Join message 20B typically includes a unicast destination address of source 16 and lists an address of router 12B within an upstream address field of the PIM Join message.

Since routers 12 are coupled by shared media LAN 14, routers 12A and 12B both receive PIM Join messages 20A, 20B. Each of routers 12A, 12B forwards to router 13 the respective one of PIM Join messages 20A, 20B for which the router 12A or 12B is listed as the upstream router. In addition, each of routers 12A, 12B snoops on the other one of PIM Join messages 20A, 20B even though the router is not necessarily along the unicast route for the message and not listed within the upstream address field of the router. That is, rather than dropping the other one of PIM Join messages 20A, 20B, each of routers 12A, 12B snoops on the PIM Join message for the (S,G) and determines if it already has PIM state for either (S,G) or (*,G). The detection of the duplicate PIM state, causes the PIM protocol executing in the control plane of routers 12A, 12B to enter a PIM assert state and triggers output of enhanced PIM assert messages 22A, 22B, respectively. As described herein, enhanced PIM assert messages 22A, 22B include indicators as to whether the asserting router has received the multicast traffic.

In this way, upstream routers 12A, 12B trigger asserts in the control plane by 'seeing joins' that were destined for other upstream neighbor routers. In response, an election process is initiated (also referred to as an "assert war"), which is typically resolved by selecting a single "assert winner" as the forwarding router for the multicast traffic based on assert metrics for the routes to (X,G), where 'X' may be either 'S" or '*."

With this control plane driven approach, one of upstream routers 12A, 12B is elected as an assert winner (also referred to herein as the "forwarding router") for forwarding the multicast traffic into LAN 14. For example, as shown in FIG. 1B, upon election of a forwarding router for (X,G) (router 12B in this example), multicast traffic 30 for (X,G) may successfully start flowing along the distribution tree between router 12B and source 16. Moreover, in accordance with the techniques described herein, router 12B outputs an enhanced PIM assert message 22B that includes an indication as to whether router 12B has successfully received multicast traffic 30 on the distribution tree and, as such, has started injecting the multicast traffic on LAN 14. Router 12A, as the loser of the assert war, implements a delayed prune of its forwarding state and prunes itself from its branch of the distribution tree only upon receiving this affirmative indication from router 12B via the enhanced PIM assert message 22B.

This technique may be particular advantageous in the event the router initially elected as the winner of the PIM election process (router 12B in this example) is unable to actually receive the multicast traffic from source 16. For example, as shown in the example of FIG. 1C, in some cases the forwarding router that was elected as the PIM assert winner may not actually be able to pull the multicast traffic by way of the multicast distribution tree established for delivery of the multicast traffic. Moreover, the inability of the assert winner (router 12B) to receive the traffic may not necessarily be due to a detectable link failure or other event, but may be due to other issues, such as the distribution tree not properly being configured in forwarding planes of intermediate devices along the path to source 16, improperly configured administrative policies along the path, or the like.

In this example, the enhanced PIM assert message 22B includes an affirmative indication that router 12B is not yet receiving and forwarding multicast traffic 30 to LAN 14. Due to the delayed pruning mechanism, router 12A does not prune itself from the distribution tree associated with multicast traffic 30. Instead, router 12A forwards multicast traffic 30 to LAN 14, which may be beneficial given that router 12B is unable to receive and forward the multicast traffic even though router 12B was elected the forwarding router. Moreover, router 12A outputs an enhanced PIM assert message 22A that include an affirmative indication that it is successfully receiving and forwarding multicast traffic 30 even though it was originally elected as the loser of the PIM assert process. In this way, router 12A avoids any potential for "black holing" of multicast traffic 30 that may otherwise arise with control plane-drive PIM assert in the event that the router (router 12B) ultimately elected as the forwarding router does not actually receive the multicast traffic.

Further, router 12B may, in some examples, continue to maintain itself in the distribution tree without pruning itself from the tree. In the event that router 12B later starts receiving multicast traffic 30, the router may initiate another PIM assert war and become the PIM assert winner, since the router may have a better metric or higher IP address. In this case, since both routers 12A, 12B have provided a positive indication via enhanced PIM assert messages 22 that multicast traffic 30 is being received, the PIM assert loser (router 12A in this example) may not prune itself from the multicast distribution tree to source 16 to reduce bandwidth consumption.

Figure 2:
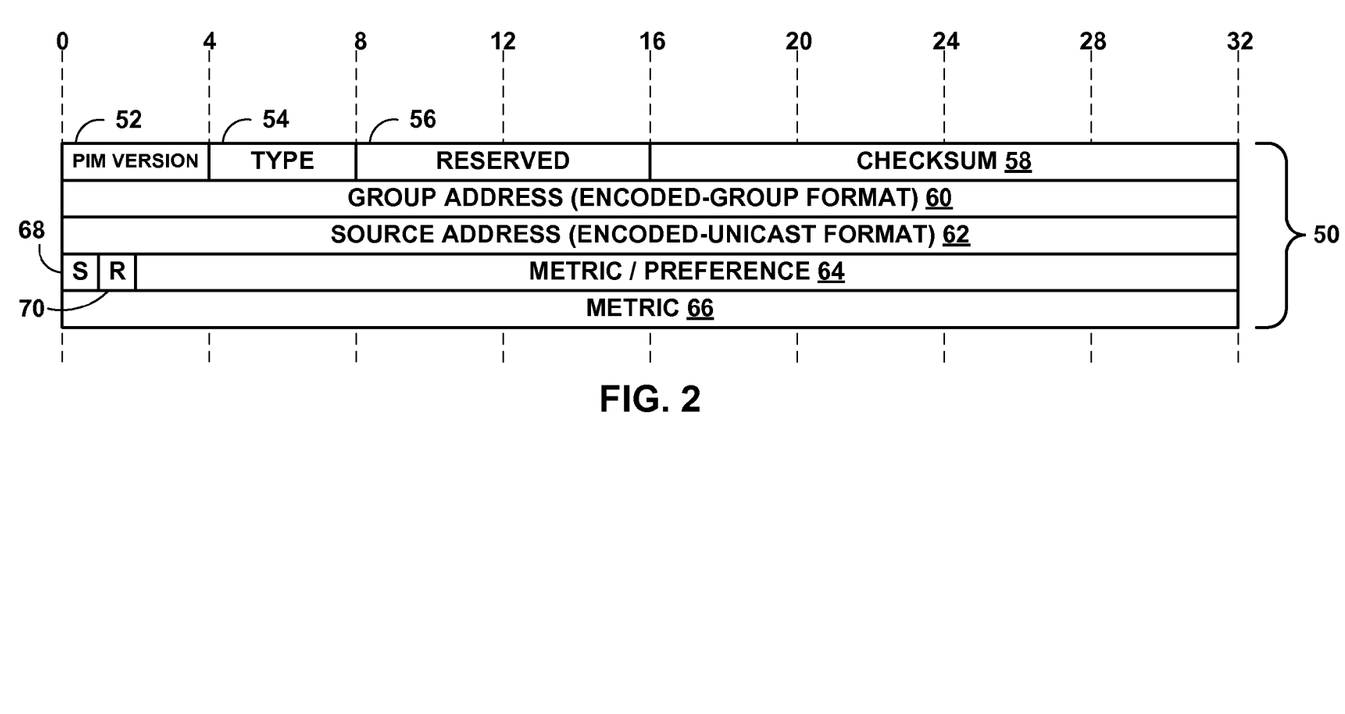
FIG. 2 is a block diagram illustrating one example data structure format for an enhanced PIM assert message as described herein.

FIG. 2 is a block diagram illustrating one example data structure format for an enhanced PIM assert message as described herein. In this example, PIM assert message 50 includes a first 32-bit word that specifies a PIM version 52, a Type 54, reserved bits 56 and a 16 bit message checksum 58, similar to a conventional PIM message. In addition, message 50 species a multicast group address and source address (S,G) or (*,G) pair 60, 62 along with a preference or metric information 64.

In the example of FIG. 2, PIM assert message has been enhanced to include an 'R' bit 70 and an 'S' bit 68. 'R' bit 70 provides an affirmative indication as to whether the asserting router is successfully forwarding on the PIM Rendezvous Point Tree. For example, setting the R bit 70 to '0' may be used to indicate that the router is successfully receiving and forwarding multicast traffic for the corresponding multicast group (*,G) onto the LAN, while setting the R bit 70 to a '1' may be used to indicate that the router is not forwarding traffic for the (*,G). As another example, setting the R bit 70 to '0' may indicated that the router is successfully receiving and forwarding the multicast traffic for the source/group combination (S,G) on the PIM Rendezvous Point Tree. 'S' bit 68 indicates that the asserting router is successfully forwarding, on the LAN, the multicast traffic for the source/group combination (S,G) for the PIM Shortest Path Tree. For example, setting the S bit 68 to '0' may be used to indicate that the router is successfully receiving multicast traffic for the corresponding multicast group (S,G) on the PIM Shortest Path Tree and forwarding the traffic onto the LAN, while setting the S bit 68 to a '1' may be used to indicate that the router is not receiving traffic for the (S,G) via the PIM Shortest Path Tree.

In this manner, an upstream router (e.g., router 12A or 12B) along a unicast route to a multicast source can specify its forwarding state to other upstream routers (e.g., router 12A or 12B). Also, this way of defining metrics for selecting a forwarding router may be compatible with legacy metrics. For example, the upstream routers may compare values with the metric/preference field 64 and, for example, whichever router is associated with a lesser value may be selected as the assert winner, i.e., the forwarding router. With respect to FIG. 2, as described herein, an upstream router currently receiving and forwarding multicast traffic (e.g., S or R bit set to a value of 0) to a shared media access network (e.g. LAN 14) may be selected as the assert winner against a non-forwarding router (e.g., S and R bit set to 1) irrespective of the metric. This way, example implementations of the techniques described herein may ensure that the upstream router that is capable of forwarding the multicast traffic emerges as the winner, thereby avoiding any black-holing of multicast traffic. The naming and usage described for the S bit 68 and R bit 70 is merely an example.

Figure 3:
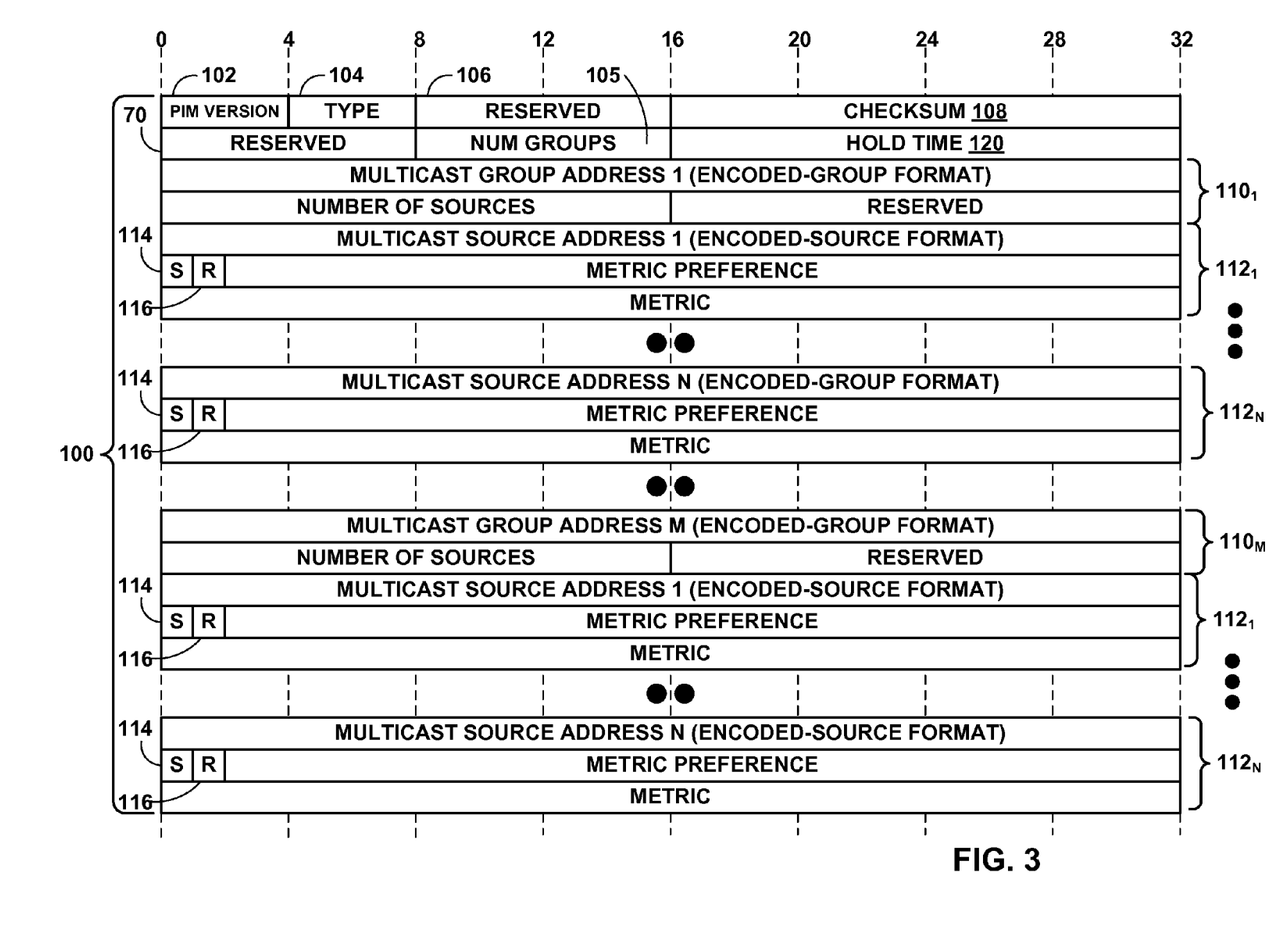
FIG. 3 is a block diagram illustrating another example data structure format for an enhanced PIM assert message that may be used with the techniques described herein.

FIG. 3 is a block diagram illustrating another example data structure format for an enhanced PIM assert message 100 that may be used with the techniques described herein. As further described, PIM assert message 100 provides an enhanced format such that a plurality of PIM asserts may be bundled in a single packet in an extensible format.

That is, rather than requiring a one-to-one corresponding between PIM assert messages and a single multicast traffic (S,G) or (*,G), PIM assert message 100 provides a more scalable solution in which asserts for multiple different (S,G) or (*,G) can be embedded within a single PIM assert message. Moreover, expanding on the example of FIG. 2, the asserting router can provide an affirmative indication from as to whether the router is or is not currently forwarding traffic for the particular (S,G) or (*,G) to the LAN. This may be particularly useful in large networks with many routers, sources and receivers. This technique may, for example, conserve router resources, network resources and bandwidth.

In this example, PIM assert message 100 includes a first 32-bit word that specifies a PIM version 102, a Type 104, reserved bits 106 and a 16 bit message checksum 108, similar to a conventional PIM message. In addition, PIM assert message 100 includes a set of TLVs for specifying assert information associated with one or more multicast group addresses (G) $110_1$ to $110_m$, where the number of multicast groups 110 in the message is specified in Num Groups field 105. For each multicast group address 110, PIM assert message 100 may include a respective multicast group address, the number of multicast sources specified in the PIM assert message for the multicast group, and a reserved set of bytes for future use.

Furthermore, PIM assert message 100 includes a set of TLVs $112_1$ to $112_N$ for each multicast group address 110 for specifying assert information associated with particular multicast source addresses (S). Each multicast source 112 for a given multicast group 110 may include a multicast source address, one more metrics and preferences, and a corresponding 'S' bit and 'R' bit. As an extension to the example of FIG. 2, PIM assert message 100 includes an 'R' bit 116 and an 'S' bit 114 for each multicast group and source combination, where the source may be a value indicative of a wildcard. Each of 'R' bits 114 provides an affirmative indication as to whether the asserting router is successfully forwarding on the PIM Rendezvous Point Tree (*,G) for the given multicast group. Each of 'S' bits 116 indicates that the asserting router is successfully forwarding, on the LAN, the multicast traffic for the respective source/group combination (S,G) for the PIM Shortest Path Tree. By bundling assert information for multiple (S,G)'s in one PIM assert message, the number of assert packets in the network can be reduced. Also, the packet formation and processing for multiple (S,G) states can be optimized for a single packet.

In addition, in the example of FIG. 3, PIM assert message 100 includes a hold time field that may be used by the asserting router to inform the other routers of a hold time value to use by those routers when setting PIM assert timeout values. In general, the PIM protocol requires an assert winner to send period PIM assert refresh messages, and such messages must arrive within the timeout value otherwise another assert war may be triggered. However, unlike conventional PIM protocols, enhanced PIM assert message 100 provides for a configurable hold time 120 that may be set by the asserting router. This may be advantageous over conventional protocols that specify static refresh and hold times for PIM asserts. By using the described techniques, the asserting router may configure hold time 120 to space refresh messages received from the other routers, which is typically one-third of the hold time value. With this approach, even if one or two assert messages are not received within the hold time, the other routers won't timeout the assert state. This may avoid unnecessary timing out of assert states on the non-winner routers in the event an assert refresh by the assert winner is not received. This may avoid unnecessary re-triggering of assert war and duplication of traffic.

Moreover, in some example implementations the asserting router may set hold time 120 with a specialized value, such as 0xFFFF, to signify a hold time of "infinity." In particular, this specialized value may be used to indicate to the other routers that the assert winner is going to terminate sending PIM assert refreshes. For example, in some situations where the assert procedure for an (S,G) or (*,G) has converged and has been stable for some time, there may be no benefit in the assert winner continuing to send PIM assert refresh messages. Instead, the asserting router may specify a hold time 120 of "infinity." In response, other routers not initializing hold time timers and, therefore, not timing out in the event a PIM assert refresh is not received. This may save bandwidth and network resources relative to conventional PIM protocols in which assert refreshes cannot be stopped even if there is no other router seeking to become a forwarder. The techniques provide a mechanism for terminating PIM assert refreshes while avoiding the potential for other routers to unnecessarily timeout of their assert states and triggering another assert war. If there is a new forwarder on the LAN with a better metric or the winner sends a CANCEL assert message, then the downstream routers can switch to the new upstream router based on the assert metric or unicast.

Figure 4:
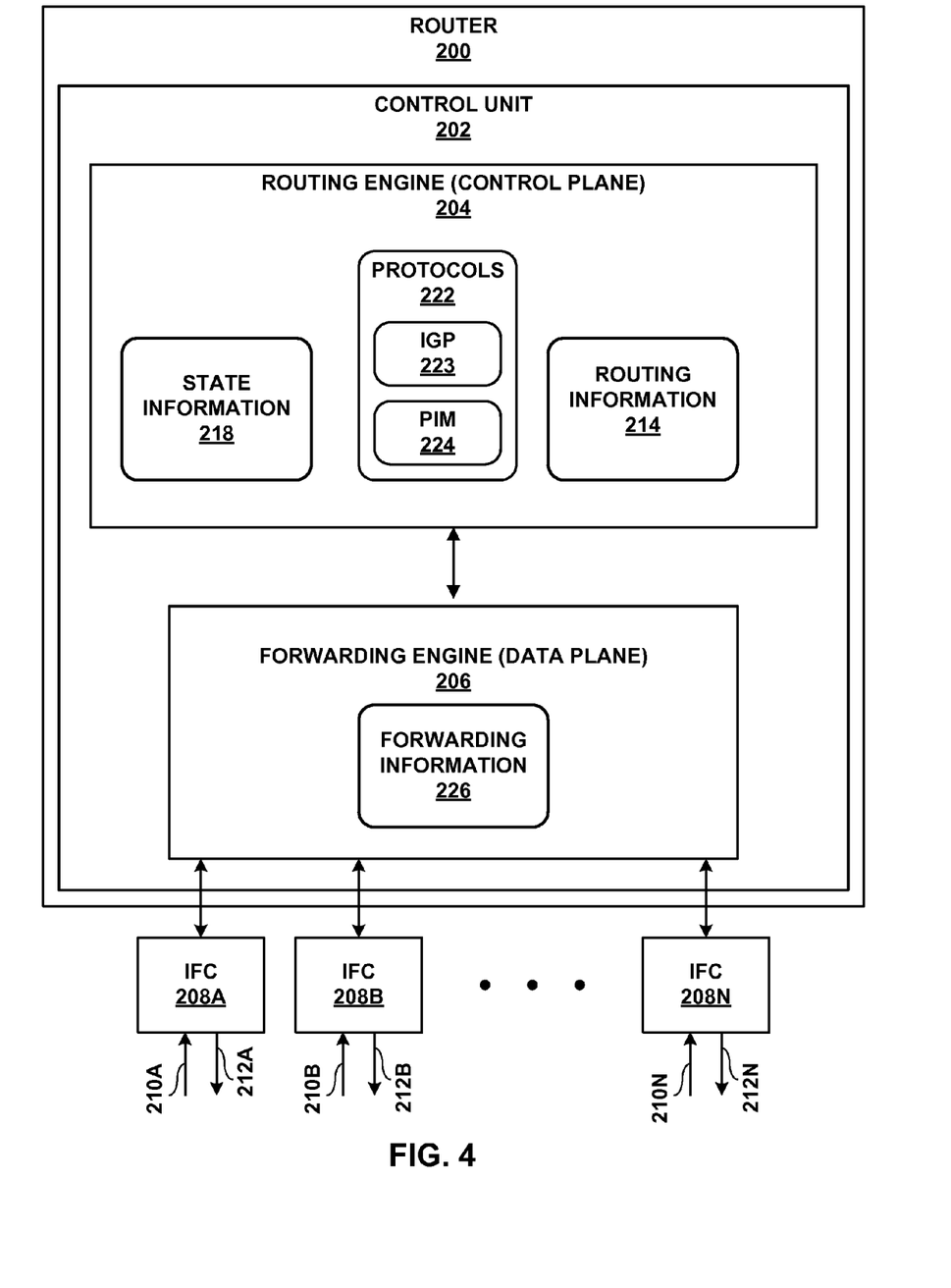
FIG. 4 is a block diagram illustrating an exemplary router configured to execute a PIM packet relay unit in a control plane to transmit PIM control packets according to the techniques of this disclosure.

FIG. 4 is a block diagram illustrating an exemplary router 200 capable of performing the disclosed techniques for robust control plane-driven PIM assert. In general, router 200 may operate substantially similar to any of the routers illustrated in FIGS. 1A-1C.

In this example, router 200 includes interface cards 208A-208N ("IFCs 208") that receive multicast packets via incoming links 210A-210N ("incoming links 210") and send multicast packets via outbound links 212A-212N ("outbound links 212"). IFCs 208 are typically coupled to links 210, 212 via a number of interface ports. Router 200 also includes a control unit 202 that determines routes of received packets and forwards the packets accordingly via IFCs 208.

Control unit 202 may comprise a routing engine 204 and a packet forwarding engine 206. Routing engine 204 operates as the control plane for router 200 and may include, for example, a hardware-based processor (e.g., general purpose processor, DSP, ASIC or the like). The processor may, for example, execute an operating system that provides a multi-tasking operating environment for execution of a number of concurrent software processes having executable instructions. Routing engine 204 may implement one or more routing protocols 222 to execute routing processes. For example, routing protocols 222 may include an Interior Gateway Protocol (IGP) 223, for exchanging routing information with other routing devices and for updating routing information 214. In addition, routing protocols 222 may include PIM 224, such as PIM-SM, for routing traffic through a computer network with other routing devices conceptually formed into shared tress. Routing engine 204 may also implement PIM 224 for exchanging link state information with other routing devices and updating state information 218, and routing multicast traffic associated with the multicast distribution trees according to routing information 214 and state information 218.

Routing information 214 may describe a topology of the computer network in which router 200 resides, and may also include routes through the shared trees in the computer network. Routing information 214 describes various routes within the computer network, and the appropriate next hops for each route, i.e., the neighboring routing devices along each of the routes. For example, a given route may comprise a route for multicast traffic for a given multicast group G or source and group combination (S,G).

Routing engine 204 analyzes stored routing information 214 and state information 98 and generates forwarding information 106 for forwarding engine 206. Forwarding information 206 may associate, for example, network destinations for certain multicast groups with specific next hops and corresponding IFCs 208 and physical output ports for output links 212. Forwarding information 226 may be a radix tree programmed into dedicated forwarding chips, a series of tables, a complex database, a link list, a radix tree, a database, a flat file, or various other data structures.

In general, when router 200 receives a multicast packet via one of inbound links 210, control unit 202 determines a next hop for the packet in accordance with forwarding information 226 and forwards the packet according to the next hop. Moreover, when router 200 receives a control plane packet, such as a PIM Join, Assert, Refresh or other message, forwarding engine 206 directs the control plane packet for routing engine 204 for processing. In this way, protocols 222, including IGP 223 and PIM 224, process control plane messages conforming to their respective protocols. Similarly, IGP 223 and PIM 224 output control plane messages for their respective protocols. As such, PIM 224 may perform the control plane PIM snooping functions to trigger robust control plane PIM assert mechanisms described herein. For example, PIM 224 may communicate using any of the enhanced PIM assert messages 50, 100 of FIGS. 2, 3, respectively. Moreover, PIM 224 may operate in accordance to the techniques described herein to implement delayed updating of its forwarding information 226 and delayed pruning in the control plane from a branch of a given multicast distribution tree only upon receiving affirmative indication, via the enhanced PIM assert message, that another router is forwarding the multicast data.

Figure 5:
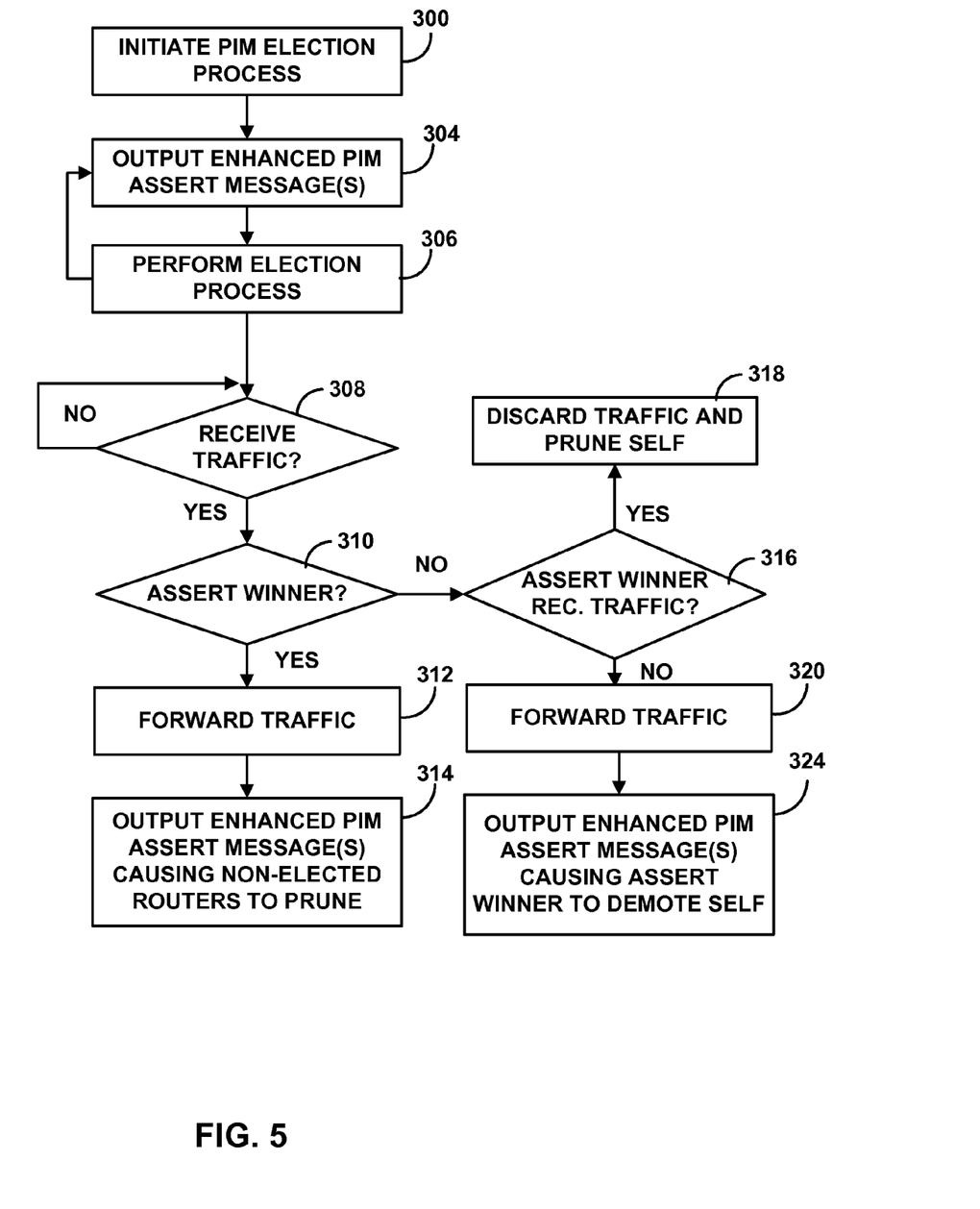
FIG. 5 is a flowchart illustrating high-level operation of a router or other network device in accordance with the techniques described herein.

FIG. 5 is a flowchart illustrating high-level operation of a router or other network device in accordance with the techniques described herein. Initially, a PIM assert procedure is triggered for election of a forwarding router (300). This may be triggered, for example, upon receiving a plurality of PIM join messages in a control plane of the router, where the PIM join messages indicate that there are multiple routers coupled to a shared media computer network (e.g., a LAN) that are upstream routers along different paths to a source of multicast traffic.

In association with the PIM election process, the router outputs enhanced PIM assert messages (304). The enhanced PIM assert message may, for example, provide an express indication as to whether the asserting router has successfully received multicast traffic on a distribution tree associated with the multicast traffic and has started injecting the multicast traffic onto the LAN. Based on the PIM assert messages, the routers elect a forwarding router for forwarding the multicast traffic to the LAN (306). In association with the PIM election process, the routers may output additional PIM assert messages to indicate to each other any status changes as to whether the multicast traffic is received from the multicast distribution tree. Moreover, prior to any of the multicast traffic being actually received by any of the routers, all of the routers maintain their branches of the multicast distribution tree as active even though only one of the routers won the forwarding router election process.

At some point, the router may, along with some of the other routers involved in the PIM assert war, start receiving the multicast traffic (308). At this time, operation of the router depends upon whether the router was elected the forwarding router for the multicast traffic and, if not, whether the forwarding router has provided an indication that it is receiving multicast traffic.

For example, if the router that has been elected as forwarding router is the first router to receive the multicast traffic from the source (YES of 310), then the router forwards the traffic to the LAN (312) and outputs an enhanced PIM assert to indicate to the other routers not elected as the forwarding router that the traffic is successfully being received and injected into the LAN, which causes the other routers to prune themselves from the multicast distribution tree (314).

However, if a router receives the multicast traffic from the source and is not the router that won the PIM election process and, therefore, is not the forwarding router (NO of 310), then the router determines, based on any previously received enhanced PIM assert messages, whether the forwarding router has been able to successfully receive the multicast traffic (316). If so, the router discards the traffic and prunes itself from the multicast distribution tree. If, however, the forwarding router has not provided an indication that it has successfully received the multicast traffic its branch of the multicast distribution tree (NO of 316), then the router forwards the traffic to the LAN (320) and outputs an enhanced PIM assert to indicate to the other routers that the traffic is successfully being received and injected into the LAN, which causes the router currently elected as the forwarding router to demote itself from the forwarding router status (324). The demoted router, however, may keep its branch of the multicast distribution tree in tact since, in the event the demoted router subsequently receives the multicast traffic, the router may trigger another PIM election process and possibly be reinstated as forwarding router due to, for example, a better metric with respect to the multicast source.

In some examples, to facilitate this process, the PIM protocol implemented by routers in accordance with the techniques described herein may operate in accordance with typical PIM assert states of Winner, Loser and No-info plus an additional state referred to herein as Remote-Join. This newly introduced state of operation may be used when a router has lost an assert war or otherwise been demoted from forwarding router status due to the fact that the router is not currently receiving the multicast traffic but, based on the metrics or preferences of the routers involved in the assert war, may subsequently be promoted to forwarding router upon actually receiving the multicast traffic.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   initiating a Protocol Independent Multicast (PIM) election process for selecting one of a plurality of routers as a forwarding router to forward multicast traffic to a shared media computer network;
   determining, with a first one of the routers, whether the first one of the routers has received the multicast traffic; and
   outputting, with the first one of the routers based on the determination and in association with the PIM election process, a PIM assert message,
   wherein the PIM assert message comprises assert information for a plurality of different multicast sources for a plurality of multicast groups, and
   wherein the PIM assert message includes, for each of the multicast sources of each of the multicast group, an indication as to whether the first one of the routers has successfully received multicast traffic for the corresponding combination of multicast source and multicast group.

2. The method of claim 1, further comprising:
   receiving the multicast traffic; and
   when the first one of the routers is not selected as the forwarding router, forwarding, with the first one of the routers, the multicast traffic to the shared media computer network until receiving a PIM assert message from the forwarding router that indicates that the forwarding router has successfully received the multicast traffic.

3. The method of claim 2, further comprising, upon receiving a PIM assert message from the forwarding router that indicates that the forwarding router has successfully received the multicast traffic, outputting one or more PIM messages from the first one of the routers to prune the first one of the routers from a multicast distribution tree associated with the multicast traffic.

4. The method of claim 1, further comprising:
   receiving a plurality of PIM join messages associated with the multicast traffic; and
   prior to receiving the multicast traffic, initiating the election procedure upon determining, based on the PIM join messages, that two or more of the routers coupled to the shared media computer network are upstream routers along different paths to a source of the multicast traffic.

5. The method of claim 4, wherein receiving a plurality of PIM join messages comprises snooping, in a control plane of the first one of the upstream routers, on a subset of the PIM join messages associated with other ones of the upstream routers.

6. The method of claim 1, further comprising:
   determining that the first one of the routers has been selected as the forwarding router;
   determining that the multicast traffic has not been received by the first one of the routers;
   receiving, from a second one of the routers not elected as the forwarding router, a second PIM assert message that includes an indication that the second router has successfully received the multicast traffic;
   in response to receiving the second PIM assert message and upon determining that multicast traffic has not been received by the first one of the routers selected as the forwarding router, demoting the first router from the forwarding router.

7. The method of claim 6, further comprising:
   after demoting the first one of the routers, receiving the multicast traffic at the first one of the routers; and
   initiating a second PIM election process in response to receiving the multicast traffic.

8. A method comprising:
   initiating a Protocol Independent Multicast (PIM) election process for selecting one of a plurality of routers as a forwarding router to forward multicast traffic of at least one multicast group to a shared media computer network;
   determining, with a first one of the routers, whether the first one of the routers has received the multicast traffic; and
   outputting, with the first one of the routers based on the determination and in association with the PIM election process, a PIM assert message that provides an indication as to whether the first one of the routers has successfully received the multicast traffic,
   wherein the PIM assert message includes a hold time value to indicate a hold time the routers are to use with respect to a PIM assert timeout associated with PIM refresh messages output by the first router as the forwarding router selected by the PIM election process.

9. The method of claim 8, further comprising setting the hold time value to indicate that the forwarding router is terminating output of any PIM refresh messages.

10. The method of claim 8, wherein outputting a PIM assert message comprises outputting the PIM assert message with assert information for a plurality of different multicast groups.

11. The method of claim 10, wherein the PIM assert message includes, for each of the multicast groups, a respective data bit that provides an indication as to whether the first one of the routers has successfully received multicast traffic for the corresponding multicast group.

12. The method of claim 8, wherein the PIM assert message specifies a multicast source for the multicast group and includes a data bit that specifies whether the first one of the routers has successfully received the multicast traffic for the multicast source.

13. A router comprising:
   a control unit having a hardware processor executing a Protocol Independent Multicast (PIM) protocol, wherein the control unit, when executing the PIM protocol, initiates an election process for selecting one of a plurality of routers as a forwarding router to forward multicast traffic to a shared media computer network,
   wherein the control unit determines whether the multicast traffic has been received and outputs, in association with the election process, a PIM assert message that includes an indication as to whether the router has successfully received the multicast traffic,
   wherein the control unit outputs the PIM assert message to include a hold time value that indicates a hold time for use by the other routers with respect to a PIM assert timeout associated with PIM assert refresh messages subsequently output by the network device.

14. The router of claim 13, wherein, when the router is not elected from the plurality of routers as the forwarding router, the control unit does not prune the router from a multicast distribution tree associated with the multicast traffic until receiving a PIM assert message from the forwarding router that indicates that the forwarding router has successfully received the multicast traffic.

15. The router of claim 13, wherein, when the router receives the multicast traffic but has not been elected as the forwarding router and has not received a PIM assert message from the forwarding router that indicates that the forwarding router has successfully received the multicast traffic, the router forwards the multicast traffic to the shared media network.

16. The router of claim 13, wherein, prior to receiving the multicast traffic, the control unit triggers the election process upon receiving a plurality of PIM join messages that indicate that two or more of the routers coupled to the shared media computer network are upstream routers along different paths to a source of the multicast traffic.

17. The router of claim 13, wherein the control unit demotes the router from the forwarding router when the router is initially elected as the forwarding router and receives a PIM assert message from a second one of the routers that indicates that the second one of the routers has successfully received the multicast traffic prior to the router receiving the network traffic.

18. The router of claim 13, wherein the PIM protocol sets the hold time value within the PIM assert message to indicate that the router is terminating output of any PIM assert refresh messages for any multicast source group (S,G) combination or multicast group (*,G) specified in the PIM assert message.

19. The router of claim 13,
wherein the PIM protocol constructs the PIM assert message to contain assert information for a plurality of different multicast groups,
wherein the PIM assert message includes, for each of the multicast groups, an indication as to whether the router has successfully received multicast traffic for the corresponding multicast group.

20. The router of claim 13, wherein the control unit constructs the PIM assert message to specify a multicast source for the multicast group and to include a data bit that specifies whether the router has successfully received the multicast traffic for the multicast source.

21. A router comprising:
a control unit having a hardware processor executing a Protocol Independent Multicast (PIM) protocol, wherein the control unit, when executing the PIM protocol, initiates an election process for selecting one of a plurality of routers as a forwarding router to forward multicast traffic to a shared media computer network,
wherein the control unit determines whether the multicast traffic has been received and outputs, in association with the election process, a PIM assert message,
wherein the PIM assert message comprises assert information for a plurality of different multicast sources for a plurality of multicast groups, and
wherein the PIM assert message includes, for each of the multicast sources of each of the multicast group, an indication as to whether the router has successfully received multicast traffic for the corresponding combination of multicast source and multicast group.

22. The router of claim 21, wherein the shared media computer network comprises a layer two (L2) local area network (LAN).

* * * * *